United States Patent
Antunes et al.

(10) Patent No.: US 8,167,552 B2
(45) Date of Patent: May 1, 2012

(54) ASYMMETRICAL MEMBER FOR LOCKING RING SECTORS TO A TURBINE ENGINE CASING

(75) Inventors: Serge Louis Antunes, Combs la Ville (FR); David Da Silva, Juvisy sur Orge (FR)

(73) Assignee: Snecma, Paris (FR)

( * ) Notice: Subject to any disclaimer, the term of this patent is extended or adjusted under 35 U.S.C. 154(b) by 469 days.

(21) Appl. No.: 12/430,542

(22) Filed: Apr. 27, 2009

(65) Prior Publication Data

US 2009/0285679 A1  Nov. 19, 2009

(30) Foreign Application Priority Data

May 16, 2008  (FR) ..................... 08 53180

(51) Int. Cl.
*F01D 11/00* (2006.01)
(52) U.S. Cl. .............. 415/214.1; 415/139; 415/173.1; 415/189; 415/190; 415/209.2; 415/209.3; 415/209.4
(58) Field of Classification Search ........... 415/214.1, 415/148
See application file for complete search history.

(56) References Cited

U.S. PATENT DOCUMENTS

| 6,575,697 | B1* | 6/2003 | Arilla et al. | 415/173.1 |
| 7,594,792 | B2* | 9/2009 | Audeon et al. | 415/135 |
| 2009/0123278 | A1* | 5/2009 | Audeon et al. | 415/214.1 |
| 2009/0123280 | A1* | 5/2009 | Audeon et al. | 415/214.1 |
| 2010/0192594 | A1* | 8/2010 | Le Saint | 60/787 |
| 2010/0296925 | A1* | 11/2010 | Sakai | 415/214.1 |

FOREIGN PATENT DOCUMENTS

| EP | 0 959 230 A2 | 11/1999 |
| EP | 1 717 418 A1 | 11/2006 |
| EP | 1 847 686 A1 | 10/2007 |

\* cited by examiner

*Primary Examiner* — Benjamin Sandvik
*Assistant Examiner* — Krista Soderholm
(74) *Attorney, Agent, or Firm* — Oblon, Spivak, McClelland, Maier & Neustadt, L.L.P.

(57) ABSTRACT

A locking member for a device for fastening ring sectors to an aircraft turbine engine casing is disclosed. The member has first and second clamping branches, which are connected together by curving joining portions, via a connecting branch. The joining portion of center thickness E1 has an inside surface of mean radius Rm1, and the joining portion of center thickness E2 has an inside surface of mean radius Rm2. Thickness E1 is strictly smaller than thickness E2, and mean radius Rm1 is strictly smaller than mean radius Rm2.

14 Claims, 3 Drawing Sheets

ASYMMETRICAL MEMBER FOR LOCKING RING SECTORS TO A TURBINE ENGINE CASING

TECHNICAL FIELD

This invention relates in general to a locking member for a device for fastening ring sectors to an aircraft turbine engine, e.g., a turbine casing.

The invention likewise relates to an aircraft turbine engine comprising such locking members, this turbine engine being capable of assuming the form of a turboprop engine or a turbojet engine.

PRIOR ART

It is known from the prior art to fasten ring sectors circumferentially onto the casing, around the moving blades of the turbine of a turbojet engine, these sectors jointly forming a continuous cylindrical casing externally defining the path for stream of gases flowing inside the turbine. The ring sectors are mounted onto an internal casing of the turbine by means of casing elements, which are called intermediate casing elements or spacers, to which they are attached at the front end thereof and held at the rear end thereof by C-shaped or sideways U-shaped locking members. The latter are engaged axially/longitudinally from the rear onto circumferential rims of the rear ends of the ring sectors and of the intermediate casing elements, in order to keep them pressed firmly together in the radial direction.

This attachment of the ring sectors onto the intermediate elements of the casing of the turbine enables them to follow the thermal expansions and contractions of the turbine casing into which hot gases or cold gases are injected in order to control the thermal expansions and contractions thereof, so as to maintain the smallest possible radial clearance between the internal surfaces of the ring sectors and the ends of the moving blades of the turbine, and to thus increase the efficiency of the turbine.

In a known way, the locking members jointly form an annular locking device centred on the axis of the turbine engine, each member therefore forming just one angular sector of this device. Each member comprises two longitudinal clamping branches extending axially/longitudinally rearward and connected at the rear ends thereof by a connecting branch, while the front ends of same are intended to press between them at least one ring sector against at least one casing element. These two latter elements, which are pressed together radially, are effectively designed to be housed in the space formed between the two longitudinal branches, which is open longitudinally towards the front.

The locking members are designed, particularly in terms of the elasticity and spacing of the two longitudinal branches, so that the radial clamping force applied is effective during operation of the engine, over a specific lifespan. This commonly results in a so-called symmetrical design, namely one having a locking member of which the cross-section, along a plane perpendicular to the circumferential direction, has symmetry along a substantially longitudinal straight line passing through the connecting branch at the centre thereof, and on both sides of which the two clamping branches are arranged.

However, a design such as this does not prove to be entirely optimised, in terms of global mass and overall dimensions.

OBJECT OF THE INVENTION

The purpose of the invention, therefore, is to at least partially remedy the aforementioned disadvantages relating to the embodiments of the prior art.

To accomplish this, the object of the invention is firstly a locking member of a device for fastening ring sectors to an aircraft turbine engine casing, said member extending in a circumferential direction between a first circumferential end and a second circumferential end, said member having, in a cross-section along a plane perpendicular to said circumferential direction, first and second clamping branches connected together at the rear end of same, by means of first and second curved joining portions, respectively, by a connecting branch extending substantially parallel to the general spacing direction of the two clamping branches, the front ends of the two clamping branches being intended to press between them at least one ring sector against at least one casing element. Furthermore, said member is such that, in said cross-section:

said first clamping branch has a first inside surface;
said second clamping branch has a second inside surface;
said connecting branch has an inside connecting surface;
said first curved joining portion has a first inside joining surface having a mean radius Rm1; and
said second curved joining portion has a second inside joining surface having a mean radius Rm2.

Furthermore, said first curved joining portion is defined by a first angular sector, which is defined, on the one hand, by the normal to said first inside surface, at the connecting point with said first inside joining surface, and, on the other hand, by the normal to said inside connecting surface, at the connecting point with said first inside joining surface, and said second curved joining portion being defined by a second angular sector which, on the one hand, is defined by the normal to said second inside surface, at the connecting point with said second inside joining surface, and, on the other hand, by the normal to said inside connecting surface, at the connecting point with said second inside joining surface.

Finally, in the direction of the bisectrix of the first angular sector, said first curving joining portion has a thickness E1, and, in the direction of the bisectrix of the second angular sector, said second curved joining portion has a thickness E2.

According to the invention, thickness E1 is strictly smaller than thickness E2, and mean radius Rm1 is strictly smaller than mean radius Rm2.

Thus, in an original manner contrary to the embodiments of the prior art, the invention provides for a so-called asymmetrical design which takes account of the temperature gradient existing on turbine engines during the operation thereof, and which enables the mass and overall dimensions of the locking member to be optimised.

As a matter of fact, since a temperature gradient is usually applied in the general direction of spacing of the two clamping branches, which preferably corresponds to the radial direction of the turbine engine, the upper and lower radial portions of the member are therefore subjected to heterogeneous temperature stresses during operation. In light of this constant, the invention therefore proposes to provide for a first curved joining portion, which is intended to be oriented towards the coolest portion of the turbine engine, which has an smaller overall mean radius and smaller thickness than those of the second curved joining portion, which itself is intended to be oriented towards the hottest portion of the turbine engine.

In this way, reducing the mean radius and thickness of the first curved joining portion clearly enables the mass and overall dimensions of the locking member of this portion to be minimised, while at the same time being capable of offering a substantially similar criticality in creep to that offered by the second curved joining portion, during operation of the turbine engine. As a matter of fact, since the creep results from the pair of temperature and mechanical stresses, the constant criticality offered by the two joining portions with regard to this creep is explained by the fact that the first portion is more mechanically stressed because of the smaller mean radius and thickness thereof, but less thermally stressed because of the aforesaid temperature gradient.

Finally, in a general way, it can be stated that the asymmetry employed advantageously allows a reduction in the mass and overall dimensions of the locking member, without it being embrittled from a creep viewpoint, thereby enabling same to have a perfectly satisfactory service life.

The ratio E1/E2 is preferably such that 0.3<E1/E2<1, and the ratio Rm1/Rm2 is such that 0.3<Rm1/Rm2<1. Still more preferably, the ratio E1/E2 is such that 0.5<E1/E2<0.85, and the ratio Rm1/Rm2 is such that 0.5<Rm1/Rm2<0.85. These values are adopted because they make it possible to better adapt to the temperature gradients commonly encountered on turbine engines.

Preferably, in said cross-section, each first inside surface, second inside surface and inside connecting surface assumes the form of a straight line. In the same way, each of the first and second inside joining surfaces assumes the form of an arc of circle or a succession of arcs of circles.

A first solution consists in providing for the thickness of said first curving joining portion to decrease in the direction running from the connecting branch towards said first clamping branch. Another solution consists in providing for the thickness of said first curved joining portion to decrease and then increase in the direction running from the connecting branch towards said first clamping branch.

Preferably, the locking member forms an angular sector of an annular locking device, which is intended to be centred on the axis of the turbine equipped with such a device.

Another object of the invention is a device for fastening ring sectors to a aircraft turbine engine casing, comprising casing elements formed with first rear circumferential rims onto which are applied second rear circumferential rims of the ring sectors, the fastening device further comprising a plurality of locking members as described above, which are engaged on said first and second circumferential rims in order to hold them pressed against one another. In a case such as this, since the first and second circumferential rims extend rearward in the longitudinal direction, they therefore penetrate through the front opening of the members, which is defined between the clamping branches, so as to be held pressed together radially therein.

Another object of the invention is an aircraft turbine engine turbine comprising a device for fastening ring sectors, as described above, and/or at least one locking member, as described above. This could alternatively involve a turbo engine compressor, without exceeding the scope of the invention.

A first solution consists in providing for said first clamping branch to be oriented radially outward in relation to said second clamping branch. This case, which is most common, is anticipated when the temperature gradient decreases in the radially outward direction, thereby exposing the first curved joining portion having reduced dimensions to lower thermal stress than that undergone by the second curved joining portion.

One alternative consists in providing for the first clamping branch to be oriented radially inward in relation to said second clamping branch, when the temperature gradient is exerted in the opposite direction from that indicated above.

Finally, an object of the invention is an aircraft turbine engine comprising a turbine as described above, and/or a device for fastening ring sectors, as described above, and/or at least one locking member, as described above, this turbine engine having the capability of equally being either a turbojet engine or a turboprop engine.

Other advantages and characteristics of the invention will become apparent from the following detailed, non-limiting description.

BRIEF DESCRIPTION OF THE DRAWINGS

This description will be made with regard to the appended drawings, in which.

DETAILED DESCRIPTION OF PREFERRED EMBODIMENTS

Figure 1:
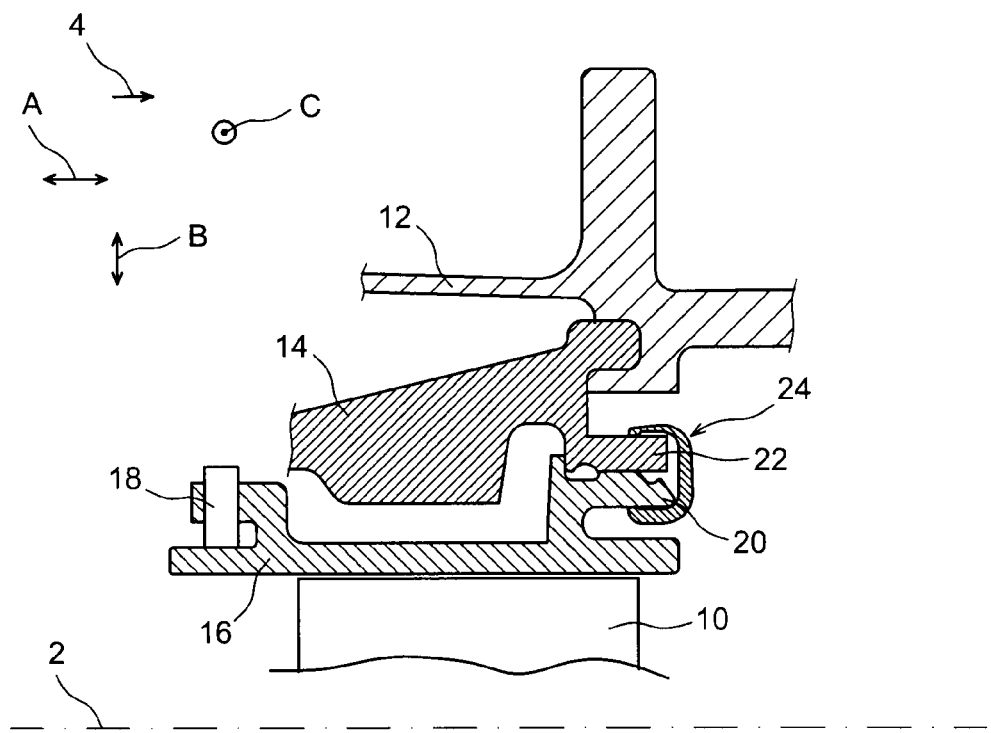
FIG. 1 shows a partial longitudinal cross-sectional view of a device for fastening ring sectors to an aircraft turbine engine turbine casing, according to a preferred embodiment of this invention.
Figure 2:
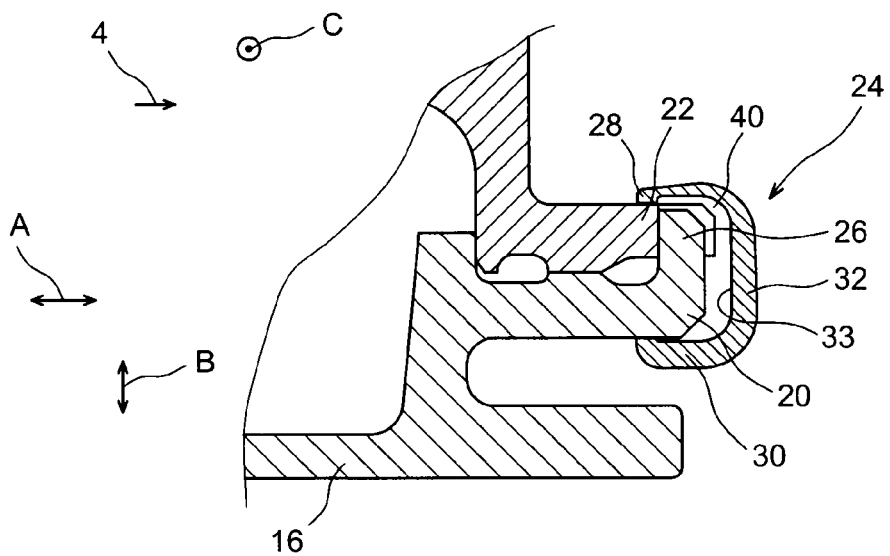
FIG. 2 shows an enlarged partial view similar to that shown in FIG. 1.

With joint reference to FIGS. 1 and 2, a device can be seen for fastening ring sectors to an aircraft turbine engine turbine casing, according to a preferred embodiment of this invention.

In the figures, direction A corresponds to the longitudinal direction or axial direction, which is parallel to the longitudinal axis 2 of the turbine and turbine engine. Direction B corresponds to the radial direction of the turbine, and direction C to the circumferential direction. Furthermore, arrow 4 diagrams the principal direction of gas flow within the turbine engine, which is parallel to direction A, while the terms "front," "upstream," "rear," and "downstream" used in the remainder of the description are to be considered in relation to a direction of forward movement of the aircraft under the influence of the thrust of the turbine engine, this direction of forward movement being opposite to the direction of arrow 4.

In FIG. 1, reference 10 designates the moving blades of a high-pressure turbine stage of a turbojet engine, which rotates inside a turbine casing 12 inside of which casing elements 14 are fastened, which are called spacers or intermediate casing elements. Elements 14 hold ring sectors 16, which are arranged circumferentially about the axis of rotation 2 of the turbine, in direction C, the internal surfaces of these ring sectors forming a continuous cylindrical surface which externally defines a path for the stream of gases flowing inside the turbine.

The ring sectors 16 have an angular spread about the axis of the turbine, in direction C, of approximately 10 to 20°, and number about thirty, for example.

Each ring sector 16, at the upstream end or front end thereof, includes a circumferential cylinder segment rim 18, by which it is attached or fastened to a spacer 14, and likewise includes, at the rear end or downstream end thereof, a circumferential cylinder segment rim 20, which is applied to corresponding cylinder segment rim 22 of the spacer 14. Hereinafter, circumferential rim 22 will be referred to as the first circumferential rim, and circumferential rim 20 will be referred to as the second circumferential rim.

The two circumferential rims 20 and 22 extending in direction A are held pressed together in direction B, in which they are superimposed over one another, by a C-shaped or sideways U-shaped locking member 24, which is engaged at the rear with circumferential rims 20 and 22, and which keeps them clamped together radially.

The locking members 24 jointly form an annular locking device which is centred on axis 2, forming an integral part of the ring sector fastening device. In this way, each member 24 assumes the form of an angular sector of the annular locking device, which, for example, extends over approximately 10 to 20°, in direction C. To form a preferably continuous, complete ring, approximately thirty of same are provided, for example, which are adjacent to one another, in direction C, and which are centred on axis 2.

In this regard, it is noted that, if the angular spread of members 24 about the axis 2 of the turbine can be of the same order as that of the ring sectors 16, then this spread can alternatively be greater, without exceeding the scope of the invention. Thus, according to circumstances, it is possible to provide one locking member 24 per ring sector 16, or else one locking member 24 for several ring sectors 16.

The ring sectors 16, spacers 14 and locking members 24 are metallic, and the locking members 24 are mounted elastically, in a clamped fashion, onto the circumferential rims 20 and 22, in order to press them against one another with a certain degree of prestressing, in the radial direction B, as will be described in detail below.

As shown schematically in FIG. 2, the second circumferential rim 20 of ring sector 16 is terminated at the rear end thereof by outwardly oriented radial teeth 26, which are inserted into corresponding notches in the first circumferential rim 22 of spacer 14, so as to immobilise each ring sector 16 on a spacer 14, in rotation about the axis 2 of the turbine.

Generally speaking, each locking member 24, when viewed as a cross-section along a plane perpendicular to direction C, as is the case in FIG. 2, includes clamping branches 28 and 30, referred to as external radial and internal radial longitudinal branches, respectively, which are rigidly connected together at the rear end of same by a connecting branch 32, and the front ends of which are applied to the external cylindrical face of the first circumferential rim 22 of spacer 14 and to the internal cylindrical face of the second circumferential rim 20 of ring sector 16, respectively. As a whole, circumferential branches 28, extend longitudinally in direction A, and are spaced apart from one another in a general spacing direction which, in this case, preferably corresponds to the radial direction B. Circumferential branch 32 extends substantially in this spacing direction, namely in the radial direction B, in order to join together the two rear ends of branches 28, 30, via curved joining portions, as will be described in detail below. These latter two branches 28, 30 thus jointly form an inter-branch space 40 which is open towards the front, in direction A, to allow passage of rims 20, 22, and which is closed towards the rear, in this same direction A, by connecting branch 32.

Figure 3:
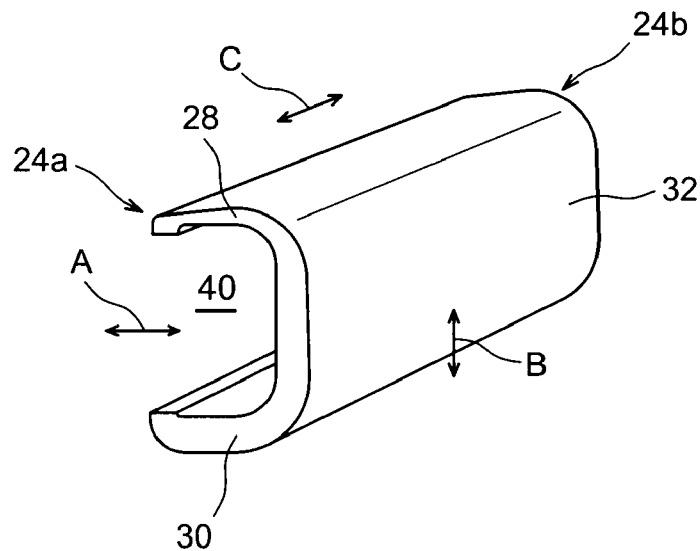
FIG. 3 shows a perspective view of a locking member belonging to the ring sector fastening device shown in FIGS. 1 and 2.

If FIG. 2 shows that, from a cross-sectional view perpendicular to direction C, member 24 assumes the shape of a C or sideways U, then it should be understood that the member extends beneath this shape over a given angular sector, in direction C, between a first circumferential end 24a and a second circumferential end 24b, as shown in FIG. 3.

Figure 4:
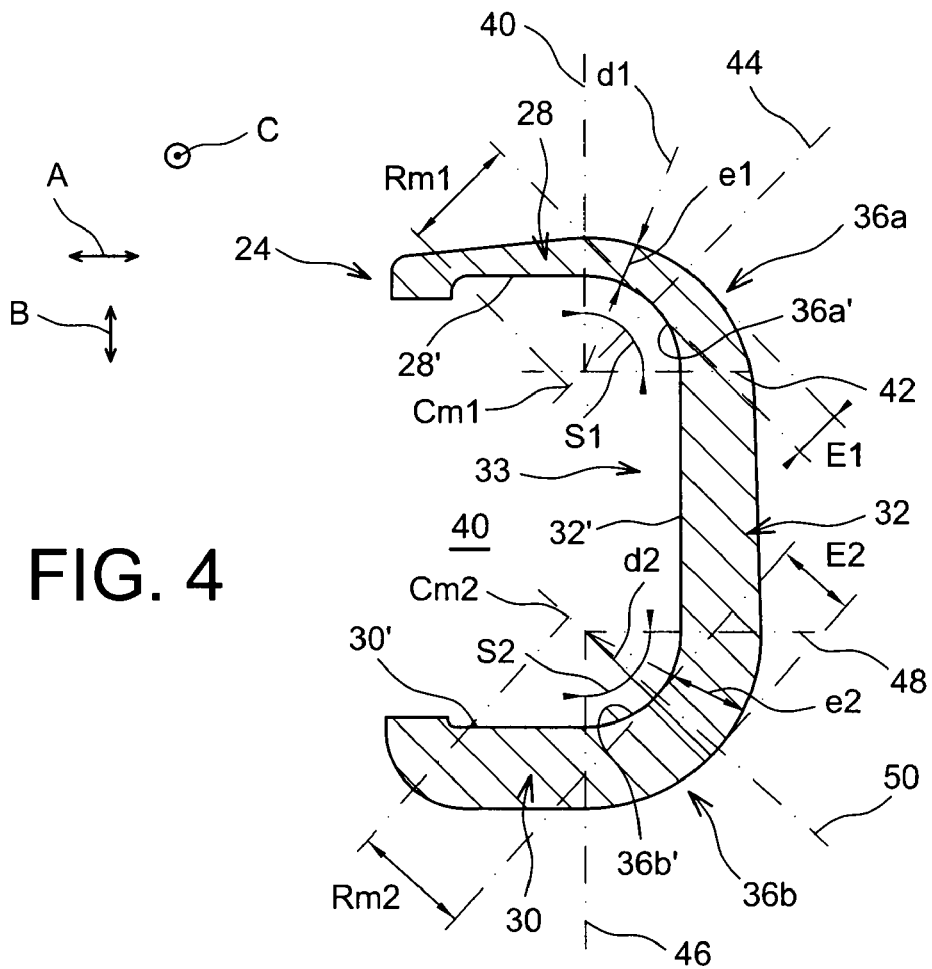
FIG. 4 shows an enlarged and detailed sectional view of the locking member shown in the preceding figures.

FIG. 4 shows a more detailed, cross-sectional view of member 24, which is perpendicular to direction C. A first curved joining portion 36a is shown therein, which is placed between the first clamping branch 28 and the connecting branch 32. This curved portion extends over a first angular sector S1, between the substantially longitudinal rear end of branch 28 and the substantially vertical upper end of branch 32. In the same way, a second curved joining portion 36b is placed between the second clamping branch 30 and the connecting branch 32. This curved portion 36b extends over a second angular sector S2, between the substantially longitudinal rear end of branch 30 and the substantially vertical lower end of branch 32.

Elements 28, 36a, 32, 36b and 30 each have a lower surface jointly forming an inside surface 33 defining space 40. More precisely, in the cross-sectional view of FIG. 4, the first branch 28 has a first inside surface 28', which, at least in proximity of the rear end thereof, assumes the form of a straight line, the latter, in fact, preferably extending within close proximity to the front clamping end. Straight line 28' is preferably oriented in direction A. Similarly, the second branch 30 has a second inside surface 30', which, at least in proximity to the rear end thereof, assumes the form of a straight line, the latter, in fact, preferably extending to within close proximity to the front clamping end. Here also, straight line 30' is preferably oriented in direction A.

Furthermore, connecting branch 32 has an inside connecting surface 32', which is preferably oriented in direction B. A first inside joining surface 36a' is situated on both sides of the latter, and is defined by the first portion 36a, and second inside joining surface 36b', which is defined by the second joining surface. These two surfaces 36a' and 36b' are each substantially curved, and preferably consist of one or more successive arcs of circles. Thus, surface 36a' is considered to have a mean radius Rm1 centred on a mean centre Cm1, and that, in the same way, surface 36b' has a mean radius Rm2 centred on a mean centre Cm2. For each of the two surfaces 36a', 36b', the mean radius can be considered to be the average of the radiuses of the arcs of circles comprising the surface, and the mean centre can be considered to be the barycentre of the centres of these arcs of circles.

Surface 36a' is arranged, on the one hand, in the rear continuity of the first inside surface 28', and, on the other hand, in the upper continuity of the inside connecting surface 32'. In this regard, it is noted that the first angular sector S1, along which the first joining portion 36a and the first inside joining surface 36a' thereof extend, is defined, on the one hand, by the normal 40 to the first inside surface 28', at the connecting point with the first inside joining surface 36a'. On the other hand, it is defined by the normal 42 to the inside connecting surface 32', at the connecting point with this same inside joining surface 36a'. The angular sector S1, which is formed by these two straight lines 40, 42, for example, has an amplitude of the order of 90°. It has a bisectrix 44, in the direction of which portion 36a has a thickness E1, which is referred to as the centre thickness because of its centred location on the sector. In this preferred embodiment, the thickness e1 of the curved joining portion 36a decreases from branch 32 to branch 28. To illustrate, in angular sector S1, thickness e1 is defined in direction d1, which passes through the centre of this sector, namely the point of intersection of normals 40, 42, which may be different from mean centre Cm1.

Thus, thickness e1 decreases gradually, it being noted that the decrease in thickness of member 24 can be initiated at the upper end of branch 32, and continue to within close proximity to the front clamping end of branch 28.

Similarly, surface 36b' is arranged, on the one hand, in the rear continuity of the first inside surface 30', and, on the other hand, in the lower continuity of the inside connecting surface 32'. It is noted that the second angular sector S2, along which the second joining portion 36b and the second inside joining surface 36b' thereof extend, is defined, on the one hand, by the normal 46 to the second inside surface 30', at the connecting point with the second inside joining surface 36b'. On the other hand, it is defined by the normal 48 to the inside connecting surface 32', at the connecting point with this same second inside joining surface 36b'. The angular sector S2, which is formed by these two straight lines 46, 48, for example, has an amplitude of the order of 90°. It has a bisectrix 50, in the direction of which portion 36b has a thickness E2, which is referred to as the centre thickness because of its centred location on sector S2. In this preferred embodiment, the thickness e2 of the curved joining portion 36b is substantially constant, having a value of E2 over the entire angular sector. To illustrate again, in angular sector S2, thickness e2 is defined in direction d2, which passes through the centre of this sector, namely the point of intersection of normals 46, 48, which may be different from mean centre Cm2.

Thus, thickness e2 is preferably constant over the entire sector S2, and may likewise correspond to the thickness of clamping branch 30. As mentioned above, the thickness of member 24 is preferably designed to begin decreasing from the lower end of the connecting branch 32.

One of the special features of the invention consists in providing for value E2 to be strictly greater than value E1, the ratio E1/E2 preferably being fixed so as to satisfy the following inequality: 0.5<E1/E2<0.85.

More generally speaking, as may be deduced from the preceding, thickness E2 is greater than any thickness e1 of the first angular sector S1.

In addition, for a reduction in the mass and overall dimensions of the first angular sector S1, the mean radius Pm1 of surface 36a' is smaller than the radius Rm2 of surface 36b', the ratio Rm1/Rm2 preferably being fixed so as to satisfy the following inequality: 0.5<Pm1/Rm2<0.85.

In the anticipated embodiment, during operation of the turbine engine, a temperature gradient is observed in direction B, this gradient decreasing from the inside to the outside. In this way, during operation, the second joining portion 36b is exposed to a higher temperature gradient than the first portion 36a, which is itself arranged radially outward, but which undergoes a weaker mechanical stress because of the larger dimensions thereof. Taking these two points into account, while at the same time specifying that the creep results from the pair of temperature and mechanical stresses, it is therefore recognised that the proposed design enables constant criticality to be obtained for these two joining portions, with regard to this creep, while at the same time reducing the mass and overall dimensions of the member in comparison with the embodiments of the prior art.

Figure 5:
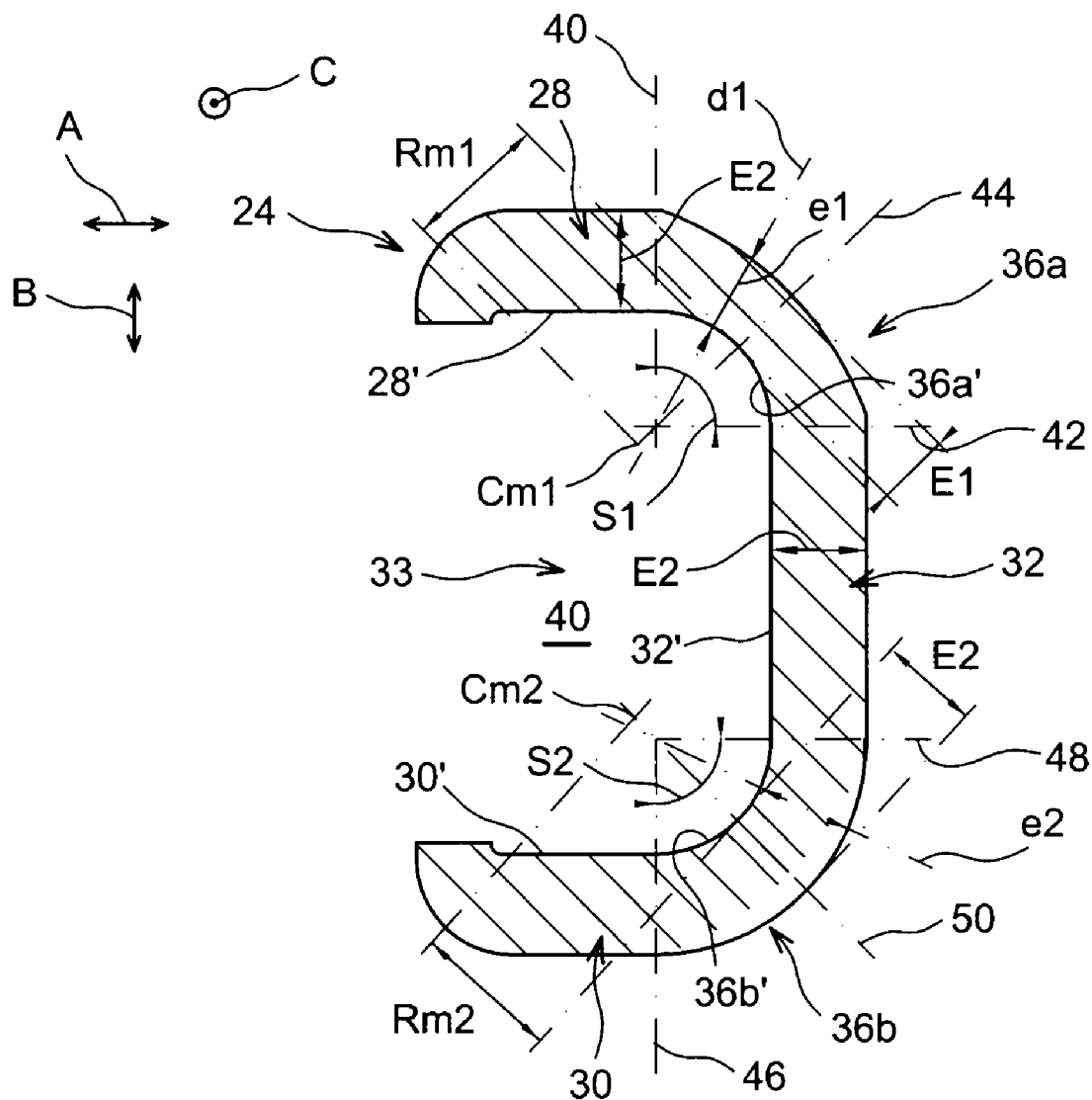
FIG. 5 shows a view similar to that shown in FIG. 4, the locking member being in the form of an alternative embodiment.

FIG. 5 shows an alternative, wherein the difference with the above-described embodiment lies in the change in the thickness e1 of the first curved joining portion 36a. Instead of decreasing over the entire angular sector S1, thickness e1 first decreases from straight line 42, in proximity to which the value thereof is identical or close to E2, in order to then gradually decrease up to bisectrix 44, where the thickness assumes the lowest value thereof E1. Next, thickness e1 gradually increases again up to straight line 42, in proximity to which the value thereof is once again identical or close to E2, which is then likewise the value of the desired preferential thickness for clamping branch 28.

Of course, a person skilled in the art could make various modification in the invention just described for non-limiting illustrative purposes only. In particular, in the opposite case of that above, wherein the temperature gradient of the turbine would increase in the outwardly radial direction, the first curved joining portion would then be oriented radially inward in relation to the second curved joining portion.

The invention claimed is:

1. A locking member of a device for fastening ring sectors to an aircraft turbine engine casing, said member extending in a circumferential direction between a first circumferential end and a second circumferential end, said member having, in a cross-section along a plane perpendicular to said circumferential direction, first and second clamping branches connected together at rear ends thereof, by first and second curved joining portions, respectively, by a connecting branch extending substantially parallel to a general spacing direction of the two clamping branches, front ends of the two clamping branches being intended to press between them at least one ring sector against at least one casing element, said member is such that, in said cross-section:
said first clamping branch has a first inside surface;
said second clamping branch has a second inside surface;
said connecting branch has an inside connecting surface;
said first curved joining portion has a first inside joining surface having a mean radius Rm1; and
said second curved joining portion has a second inside joining surface having a mean radius Rm2,
said first curved joining portion being defined by a first angular sector, which is defined by a normal to said first inside surface at a connecting point with said first inside joining surface, and by a normal to said inside connecting surface at a connecting point with said first inside joining surface, and said second curved joining portion being defined by a second angular sector which is defined by a normal to said second inside surface at a connecting point with said second inside joining surface, and by a normal to said inside connecting surface at a connecting point with said second inside joining surface,
in a direction of a bisectrix of the first angular sector, said first curving joining portion having a thickness E1, and, in a direction of a bisectrix of the second angular sector, said second curved joining portion having a thickness E2,
wherein the thickness E1 is strictly smaller than thickness E2, and the mean radius Rm1 is strictly smaller than mean radius Rm2.

2. The locking member of claim 1, wherein a ratio E1/E2 is such that 0.3<E1/E2<1, and a ratio Rm1/Rm2 is such that 0.3<Rm1/Rm2<1.

3. The locking member of claim 1, wherein a ratio E1/E2 is such that 0.5<E1/E2<0.85, and a ratio Rm1/Rm2 is such that 0.5<Rm1/Rm2<0.85.

4. The locking member as claimed in claim 1, wherein, in said cross-section, each first inside surface, second inside surface and inside connecting surface assumes the form of a straight line.

5. The locking member as claimed in claim 1, wherein, in said cross-section, each of the first and second inside joining surfaces assumes the form of an arc of circle or a succession of arcs of circles.

6. The locking member as claimed in any one of claims 1 to 5, wherein a thickness of said first curving joining portion decreases in a direction running from the connecting branch to said first clamping branch.

7. The locking member as claimed in any one of claims 1 to 5, wherein a thickness of said first curved joining portion decreases and then increases in a direction running from the connecting branch to said first clamping branch.

8. The locking member as claimed in claim 1, wherein the locking member forms an angular sector of an annular locking device.

9. A device for fastening ring sectors to a aircraft turbine engine casing, comprising:

casing elements formed with first rear circumferential rims onto which are applied second rear circumferential rims of ring sectors; and a plurality of locking members as claimed in claim 1, which are engaged on said first and second circumferential rims in order to hold the rims pressed against one another.

10. An aircraft turbine engine turbine comprising a ring sector fastening device of claim 9.

11. The turbine as claimed in claim 10, wherein said first clamping branch is oriented radially outward in relation to said second clamping branch.

12. The turbine as claimed in claim 10, wherein said first clamping branch is oriented radially inward in relation to said second clamping branch.

13. An aircraft turbine engine comprising a turbine as claimed in any one of claims 10 to 12.

14. The turbine engine of claim 13, wherein the turbine engine is a turbojet engine or a turboprop engine.

* * * * *

UNITED STATES PATENT AND TRADEMARK OFFICE
CERTIFICATE OF CORRECTION

PATENT NO. : 8,167,552 B2
APPLICATION NO. : 12/430542
DATED : May 1, 2012
INVENTOR(S) : Serge Louis Antunes et al.

It is certified that error appears in the above-identified patent and that said Letters Patent is hereby corrected as shown below:

Column 5, line 45, after "28," insert --30--;

Column 7, line 32, change "Pm1" to --Rm1--; and

Column 7, line 35, change "0.5<Pm1/Rm2<0.85" to --0.5<Rm1/Rm2<0.85--.

Signed and Sealed this
Tenth Day of July, 2012

David J. Kappos
*Director of the United States Patent and Trademark Office*